United States Patent [19]

Frodsham

[11] Patent Number: 4,584,869
[45] Date of Patent: Apr. 29, 1986

[54] METHOD AND APPARATUS FOR DETECTING KNOCK IN A SPARK IGNITION ENGINE

[75] Inventor: John S. Frodsham, Leamington Spa, England

[73] Assignee: BL Technology Limited, London, England

[21] Appl. No.: 522,673

[22] Filed: Aug. 12, 1983

[30] Foreign Application Priority Data

Aug. 12, 1982 [GB] United Kingdom ............... 8223227

[51] Int. Cl.$^4$ .............................................. G01L 23/22
[52] U.S. Cl. ...................................................... 73/35
[58] Field of Search ....................... 73/35; 364/431.08

[56] References Cited

U.S. PATENT DOCUMENTS 4,289,102  9/1981  Katsumata et al. ............... 73/35 X
4,355,534 10/1982  Roger ...................................... 73/35
4,356,551 10/1982  Iwase et al. ........................ 73/35 X
4,388,902  6/1983  Latapie ............................... 73/35 X

OTHER PUBLICATIONS

Patents Abstracts of Japan, vol. 6, No. 112 (p. 124), Jun. 23, 1982 & JP-A-57 42821 (Nissan Jidosha KK) 10-03-1982.
Prof. Dr. Ing. F. H. Lange, "Korrelations Elektronik", 1959, VEB Verlag, Berlin, DE; PP57061, p. 99, FIG. 3.1, p. 189, lines 22–38.
J. Darricau, "Physique et Theorie du Radar", vol. 2, 1973, edited by Sodipe, Paris, FR: pp. 180–183, para. 3.1.
M. J. Crocket et al., "Modeling of Diesel Engine Noise Using Coherence", 1979, pp. 155–165, Soc. of Auto. Engineers, Inc.
Elektronik, vol. 21, No. 8, Aug. 1972, pp. 275–278, L. J. Chamberlain, "Die Zeitreihenanalyse".

Primary Examiner—Stewart J. Levy
Assistant Examiner—John E. Chapman, Jr.
Attorney, Agent, or Firm—Thomas J. Greer, Jr.

[57] ABSTRACT

Transducers 16 detect local vibration of the engine and the signals therefrom can be compared using coherence or correlation functions in the region of the knock frequency to ascertain if the source of the vibrations is the same, indicating knock, or different, indicating random vibration. Two transducers spaced apart can be used, or one can measure cylinder pressure. Alternatively, one sensor could be used, using two signals delayed with respect to each other in time.

14 Claims, 1 Drawing Figure

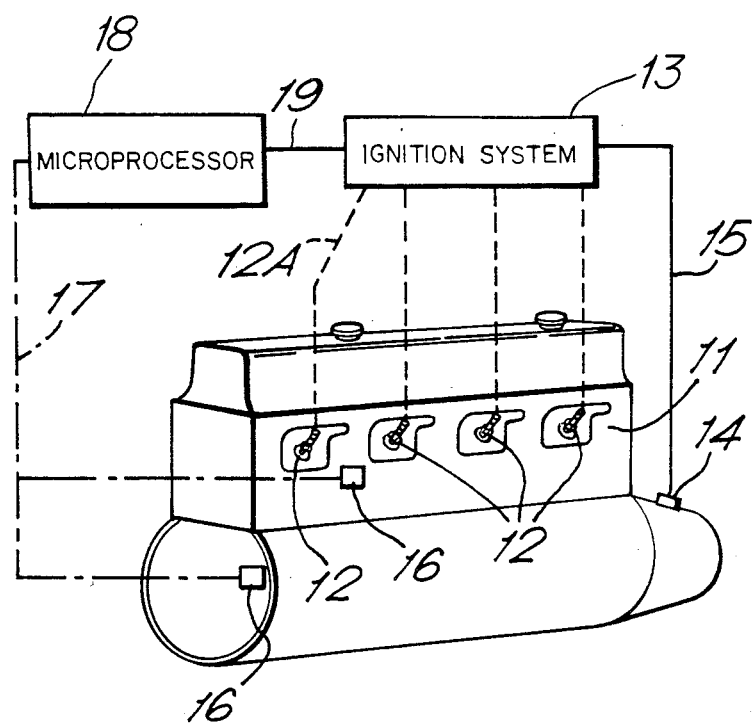

METHOD AND APPARATUS FOR DETECTING KNOCK IN A SPARK IGNITION ENGINE

This invention relates to a method and apparatus for detecting knock in a spark ignition internal combustion engine. In such an engine during a normal combustion process the last part of the fuel mixture to burn in the cylinder is heated by the already expanding gases (compression) and by an advancing flame front (radiation). As long as pressure and temperature are not excessive then the mixture will burn progressively. However if limiting values of these parameters are exceeded then combustion will occur spontaneously throughout the bulk of the fuel charge with the generation of high pressure pulse. This is transmitted to the cylinder wall to give a distinctive knocking sound.

Knocking combustion in petrol engines is characterised by the superposition of a high frequency pressure oscillation on the falling portion of the cylinder pressure development, typically in the range 6-9 kHz.

Broadly speaking the detection methods used in current systems are very similar. A knock sensor signal, normally engine vibration is band pass filtered and time windowed on a crank angle basis. This is synchronized to the engine cycle and the conditioned signal is compared to a "threshold" level. From this comparison, the occurence of knock is defined.

Difficulty arises in attempting to detect knock from engine structural vibration at high speeds. This is due to the increased level of engine mechanical noise which tends to mask the vibration response excited by engine knock.

The invention provides a method of detecting knock in a spark ignition internal combustion engine, wherein two signals derived from the vibration of the engine and/or pressure in a cylinder are compared with each other in a bandwidth which includes the knock frequency to ascertain whether they arise from the same or different sources.

With random noises the signals will be from different sources but with knocking they will be from the same source. Consequently, if the signals came from the same source, this is an indication that knock is occuring.

The invention also provides apparatus for detecting knock in a spark ignition internal combustion engine which comprises ar least one sensor for producing two signals in response to the vibration of the engine and/or pressure in a cylinder, and means for comparing the signals in a bandwidth which includes the knock frequency to ascertain whether they arise from the same or different sources.

The two signals may be derived from the same sensor, one being delayed in time compared to the other. The signals may be compared using an auto-correlation function, wherein the average of the instantaneous product of the two signals is calculated for a series of different delays between the signals, to obtain the auto-correlation function as a function of time lag.

Alternatively, the two signals may be derived from different sensors spaced apart from each other. The two signals may be compared using a cross-correlation function, wherein the average of the instantaneous product of the signal from one sensor and that from the other but delayed by a time lag is calculated for a series of different delays between the signals, to obtain the cross-correlation function as a function of time lag. The two signals may instead be compared using a cross-spectral density function, wherein the average of the instantaneous product of the fourier transform of one signal over a given period and the complex conjugate of the fourier transform of the other signal over a given period is calculated over a series of successive periods of time. The two signals may also be compared by dividing the quantity so obtained by the product of the auto-spectral density of each signal, to obtain a coherence function.

Prior methods of detection rely on a *comparison* of signal levels which may or may not be due to a knock event. By contrast, coherence functions give a measure of *correlation* berween two signals, allowing cause and effect to be identified.

The coherence function is non-dimensional with values ranging from 1 to 0, indicating linear dependance and complete independence respectively. If the value of the coherence function between two signals is high, it is likely that they stem from a common source, or a causal relationship exists between them.

Because the coherence function is dimensionless it offers an advantage over current methods of detecting knock from engine vibration. The calculation is independent of signal level, so the increase in "background" vibration with increasing engine speed is accounted for without additional gain compensation circuitry.

When knock is detected, the spark ignition is regulated to reduce the probability of knock occurring. In a preferred form of the invention the regulating step is used to ensure that the engine operates at an optimum ignition timing but not in a condition where the onset of knock occurs in the cylinder or cylinders. The optimum condition will be close to, or even limited by, the onset of knock.

The invention also provides a spark ignition internal combustion engine wherein one or more pistons reciprocate in an engine block characterised by: at least one vibration, or dynamic response, transducer mounted on the engine; an ignition system adapted so that the time of occurrence of spark ignition in the or each cylinder relative to a cylinder operating cycle datum can be advanced or retarded; and a signal conditioning coupling between the, or each, transducer and the ignition system is caused to modify the occurence of ignition in the, or at least one cylinder, to reduce the probability of knocking ocurring.

The present invention arises from the discovery that there is a degree of correlation or coherence between engine cylinder pressure variations and engine block vibration. This may be extended to cover the degree of correlation or coherence between any dynamic parameters measured during engine operation. A high degree of correlation or coherence, has been shown to indicate the onset of knock or detonation. However while the actual occurrence of knock is to be avoided efficient engine operation is generally acheived by operating the engine very close to the point where onset of knock could occur. The degree of control afforded by modern ignition systems and in particular the use of microprocessors allows engine operation to be regulated between extremely close tolerances.

The Applicants are aware of S.A.E Paper No. 790 362 (1979) entitled "Modelling of Diesel Engine Noise using coherence" by Malcolm J Crocker and James F Hamilton, which is concerned with modelling a Diesel engine as a multiple input single output system, otherwise known as a coherence model.

The invention will now be described by way of example with reference to the accompanying drawing which is a block diagram of an engine equipped with a control system in accordance with the invention.

Engine block 11 houses four in-line cylinders having reciprocatable pistons. Each cylinder contains a combustion chamber into which projects a spark plug 12. A high voltage pulse is in a known manner generated and fed to each plug in turn from an ignition system 13 along leads 12A. The system 13 has fed to it from transducer 14 signals along line 15 representative of engine speed. Transducer(s) 16 detects local dynamic response of the engine 11 and feeds along line 17 to an amplifier and microprocessor signals representing the frequency, phase and amplitude of the response signals. Consequent signals are fed to ignition system 13 by line 19.

In operation the ignition system 13 enables the engine to be operated in a conventional way. The transducer(s) 16 generates a series of signals whose profile can be correlated with one another, or with engine cylinder pressures. As has previously been described "knock" results in peak pressures being transmitted to the walls of a cylinder and it has been found that a correlation parameter is sufficient to enable the onset of knock to be detected in sufficient time for the microprocessor 18 to generate correcting signals to the ignition system 13 along line 19 so that the occurrence of the ignition spark for a given spark plug 12 can be adjusted to reduce the likelihood of knock actually occurring. The microprocessor 18 is programmed to ensure that, regardless of engine speed, the ignition pulses occur at the optimum time for effective engine operation. Since such operation may be at a level close to that resulting in the onset of knock the close control provided by the microprocessor 18 for the ignition system 13 serve to enhance engine operation.

Detonation is a combustion-excited phenomenon. If combustion is the major excitation to block vibration when running in knock, then a block vibration will be coherent with cylinder pressure at known frequency. Conversely if mechanical impacts provide the major excitation, then the degree of coherence between pressure and vibration will be low.

This can be ascertained by calculating the Multiple Coherence Function between two transducer outputs 16. This indicates the relative contributions of mechanical impacts and combustion excitation to a measured vibration signal.

In applying the methods outlined the engine is modelled as a system with multiple correlated inputs and a single output. The individual cylinder pressures are defined as inputs and engine structure-borne vibration as the system output. Extraneous vibration unrelated to the pressure inputs is also recorded at the output.

Further to this, Partial Coherence Functions can be calculated between specific pressure and vibration signals. This will indicate the fraction of vibration energy related to each pressure input when the linear links with the other pressure inputs have been removed.

The coherence function between two signals show high levels if the phenomena are excited by a common cause.

In the context of engine structural vibration this implies that if a distinct vibration mode is excited by knock then any measurements of response which include that mode will be highly coherent.

The two transducers 16 (which may be accelerometers) may simply each measure engine vibration, but it is also possible for one of the transducers to measure cylinder pressure while the other measures surface vibration. Alternatively, two signals can be obtained from a single sensor by delaying one relative to the other.

The preceding discussion covering the application of Coherence functions to detecting knock, can equally be applied to an analogous quantity in the time domain, the correlation function. This provides us with essentially the same information but presented in a different format.

Coherence functions are calculated from auto spectral density and cross-correlation functions respectively. These relationships are described in detail in Ramdom Data: Analysis and Measurement Procedures by J S Bendat and A G Piersol Wiley Interscience, New York 1971.

The major distinction between existing methods of detecting knock and that described here, is that the treatment of the sensor signals to identify the occurrence of knock. The following details the calculating necessary to obtain correlation and/or coherence function information from which the occurrence of knock may be deduced.

In the case of correlation function either the auto-correlation function of one signal, or the cross-correlation function between two signals, is calculated.

In either case the signals are transducer voltage outputs representing cylinder pressure, engine vibration, (or any combination of these), although other measures such as bolt loading could be used.

The auto-correlation function $R_{xx}(\tau)$ of a sampled time dependent variable x(t) is given by $$R_{xx}(\tau) = \frac{1}{T} \int_0^T (t)x(t + \tau)dt \; 0 \leq \tau < T$$

where T=observation time=period of engine rotation $\tau$=time delay

The following operations are therefore involved:
(1) Taking a replica of the signal x(t) and delaying this by a time displacement $\tau$ seconds.
(2) Multiplying the signal value at each point by the corresponding value that has occurred $\tau$ seconds before.
(3) Averaging the instantaneous product value over the observation time.
(4) Incrementing the lag time $\tau$ to obtain auto-correlation function versus lag time.

Similarly the cross-correlation function $R_{xy}(\tau)$ between two separate time dependent variables x(t) and y(t) is given by:

$$R_{xy}(\tau) = \frac{1}{T} \int_0^T x(t)y(t + \tau)dt \; 0 \leq \tau < T$$

the cross correlation function is calculated by:
(1) Delaying the signal x(t) relative to the signal y(t) by a time displacement equal to $\tau$ seconds, called the time delay.
(2) Multiplying the value of y(t) at any instant by the value of x(t) that had occurred $\tau$ seconds before.
(3) Averaging the instantaneous product value over the observation time.
(4) Incrementing the lag time $\tau$ to obtain cross-correlation function versus lag time.

In each case the value of the chosen correlation function at the point in the engine cycle when knock could occur is calculated. This would give a high value under knock conditions and a low value otherwise. The function value would be interrogated by the engine ignition control system and corrective action taken.

Calculation of the Coherence function requires spectral density function information. These can be obtained either through Fourier transformation of correlation functions or by Finite Fourier transforms of the original time history records.

Once again the time history records will be transducer voltage outputs representing cylinder pressure, engine vibration, or any combination although other measures such as bolt loading could be used.

The Finite Fourier transforms (FFT) of sampled time histories x(t) and y(t) are given by:

$$X(F,T) = \int_0^T x(t) e^{-j2\pi ft} dt$$

and $$Y(F,T) = \int_0^T y(t) e^{-j2\pi ft} dt$$

where X(F,T) denotes the FFT of x(t) over time frame T.
and Y(F,T) denotes the FFT of y(t) over time frame T.
and from Euler's Relation $$e^{-j2\pi ft} = \cos(2\pi ft) - j\sin(2\pi ft)$$

where
$2\pi f$ = cyclical frequency $j = \sqrt{-1}$
and
e = base of natural logarithms The relevant spectral density function may then be calculated as follows. Again this relates to transducer outputs as described earlier.

The Autospectral Density function of an individual sampled time history x(t) is given by:

$$\hat{G}_{xx}(f) = \frac{2}{ndT} \sum_{i=1}^{nd} |X_i(F,T)|^2$$

where,
$X_i(F,T)$ denotes the FFT previously defined the i subscript denotes individual time frames within the data
nd denotes the number of individual time frames
ndT denotes the total amount of data analysed
and
$\hat{G}_{xx}(f)$ denotes an estimate of $G_{xx}(f)$, a frequency dependent variable.

The Cross-Spectral Density function between two separate time dependent variables is given by:

$$\hat{G}_{xy}(f) = \frac{2}{ndT} \sum_{i=1}^{nd} X_i^*(F,T) \cdot Y_i(F,T)$$

where,
$X_i^*(F,T)$ denotes the complex conjugate of $X_i(F,T)$ $G_{xy}(f)$ denotes an estimate of $G_{xy}(f)$, frequency dependent, and other nomenclature is as previously defined.

The Coherence Function between two separate variables may now be calculated. In its simplest form this is obtained by the algebraic operation of dividing $|G_{xy}(f)|^2$ by the product of $G_{xx}(f)$ with $G_{xy}(f)$, Viz, $$\hat{\gamma}_{xy}^2(f) = \frac{|\hat{G}_{xy}(f)|^2}{\hat{G}_{xx}(f)\,\hat{G}_{yy}(f)} \quad 0 \le \gamma_{xy}^2 \le 1$$

where,
$\psi xy^2(f)$ = Coherence function between variables x and y.
$\hat{G}_{xx}(f)$ = Autospectral density function of variable x.
$\hat{G}_{yy}(f)$ = Autospectral density function of variable y.
$|\hat{G}_{xy}(f)|^2$ = Magnitude squared of the Cross Spectral Density function.

Note: (f) denotes a frequency function.

The value of the Coherence function at the point in the engine cycle when knock could occur, is calculated. This would give a high value under knock conditions and a low value otherwise. The function value would be interrogated by the engine management system and corrective action would be taken.

In a preferred form, steps are taken to ensure that one particular cylinder knocks first, and one transducer measures pressure in that cylinder, another measures block vibration adjacent to that cylinder, and a marker measures each crank revolution. The transducer outputs are filtered by low pass anti-aliasing filters, cut off 8.5 KHz. Each channel is sampled at 17 KHz to convert them to digital values. The circuitry defines time portions (or frames) of the signals for analysis. Each time frame covers compression and expansion strokes of the first knocking cylinder. Fast fourier transforms are performed on each line, and a bandwidth of 800H=centered on the characteristic knocking frequency is selected by storing between 10 and 50 time frame fouriers transforms. This will define the instantaneous spectra in the knock band.

The knock frequency data is stored for eight preceding engine cycles and continuously updated. The average spectra over knock frequency band is completed for pressure and vibration data. The average cross spectrum between pressure and vibration is also completed. The coherence is computed or the correlation is computed using the inverse fast fourier transform. The occurrence of knock is signalled as necessary.

For real-time operation, the fundamental time constraint is the acquisition time for pressure and vibration data. This is dictated by both sampling frequency and time frame size.

Figures quoted in the above description are estimates. Using these "worst case" values gives:

| | | |
|---|---|---|
| Engine speed (RPM) | 1000 | 6000 |
| Acquisition Time* (1 engine revolution - secs) | 0.06 | 0.01 |
| Frame size for FFT (NO of points) | | 256 |
| Frequency Analysis Band (NO of frequency lines) | 50 | 10 |
| Number of values for averaging calculation | 3 × (8 × 50) | 3 × (8 × 10) |
| Total computation time limit* (1 engine revolution - secs) | 0.06 | 0.01 |

I claim:

1. A method of detecting knock in a spark ignitiion internal combustion engine, wherein two signals derived from the vibration of the engine and/or pressure in a cylinder are compared with each other in a bandwidth which includes the knock frequency to ascertain whether they arise from the same or different sources, the two signals are derived from the same sensor but one is time delayed compared to the other, the signals are compared using an auto-correlation function, and the average of the instantaneous product of the two signals is calculated for a series of different delays between the signals, to obtain the auto-correlation function as a function of time lag.

2. A method as claimed in claim 1, wherein the ignition timing is regulated to reduce knock in dependence on the comparison of the signals.

3. A method of detecting knock in a spark ignition internal combustion engine, wherein two signals derived from the vibration of the engine and/or pressure in a cylinder are compared with each other in a bandwidth which includes the knock frequency to ascertain whether they arise from the same or different sources, the two signals are derived from different sensors spaced apart from each other, the two signals are compared using a cross correlation function, and the average of the instantaneous product of the signal from one sensor and that from the other but delayed by a lag time, is calculated for a series of different delays between the signals, to obtain the cross-correlation function as a function of lag time.

4. A method of detecting knock in a spark ignition internal combustion engine, wherein two signals derived from the vibration of the engine and/or pressure in a cylinder are compared with each other in a bandwidth which includes the knock frequency to ascertain whether they arise from the same or different sources, the two signals are derived from different sensors spaced apart from each other, the two signals are compared using a cross-spectral density function.

5. A method as claimed in claim 4, wherein the average of the instantaneous product of the Fourier transform of one signal over a given period and the complex conjugate of the Fourier transform of the other signal over a given period is calculated over a series of successive periods of time.

6. A method of detecting knock in a spark ignition internal combustion engine, said method comprising sensing the vibration of the engine or pressure in a cylinder by means of a sensor, and obtaining the auto-correlation function of a signal derived from the sensor, the auto-correlation function being the average of the instantaneous product of the signal and the signal delayed by a time lag as a function of time lag, to detect the presence of knock.

7. A method of detecting knock in a spark ignition internal combustion engine, said method comprising sensing the vibration of the engine or pressure in a cylinder by means of a sensor, and obtaining the auto-spectral density of a signal derived from the sensor, to detect the presence of knock.

8. A method of detecting knock in a spark ignition internal combustion engine, said method comprising sensing the vibration of the engine or pressure in a cylinder by means of two sensors spaced apart from each other, and obtaining the cross-correlation function of signals derived from the two sensors, the cross-correlation function being the average of the instantaneous product of the signal from one sensor and that from the other sensor but delayed by a time lag as a function of time lag in order to detect the onset of knock.

9. A method of detecting knock in a spark ignition internal combustion engine, said method comprising sensing the vibration of the engine or pressure in a cylinder by means of two sensors spaced apart from each other, and obtaining the cross-spectral density function of the signals derived from the sensors, in order to detect the onset of knock.

10. A method according to claim 9, wherein the cross-spectral density function is calculated by calculating the average of the instantaneous product of the Fourier transform of one signal over a given period and the complex conjugate of the Fourier transform of the other signal over a given period over a series of successive periods of time.

11. The combination comprising a spark ignition internal combustion engine and an apparatus for detecting knock in said internal combustion engine, said apparatus comprising a sensor for sensing the vibration of the engine or pressure in a cylinder, and means for obtaining the auto-correlation function of a signal derived from the sensor, the auto-correlation function being the average of the instantaneous product of the signal and the signal delayed by a time lag as a function of time lag to detect the presence of knock.

12. The combination comprising a spark ignition internal combustion engine and an apparatus for detecting knock in said internal combustion engine, said apparatus comprising a sensor for sensing the vibration of the engine or pressure in a cylinder, and means for obtaining the auto-spectral density of a signal derived from the sensor, to detect the presence of knock.

13. The combination comprising a spark ignition internal combustion engine and an apparatus for detecting knock in said internal combustion engine, said apparatus comprising two sensors spaced apart from each other for sensing the vibration of the engine or pressure in a cylinder, and means for obtaining the cross-correlation function of signals derived from the two sensors, the cross-correlation function being the average of the instantaneous product of the signal from one sensor and that from the other sensor but delayed by a time lag as a function of time lag in order to detect the onset of knock.

14. The combination comprising a spark ignition internal combustion engine and an apparatus for detecting knock in said internal combustion engine, said apparatus comprising two sensors spaced apart from each other for sensing the vibration of the engine pressure in a cylinder, and means for obtaining the cross-spectral density function of the signals derived from the sensors, in order to detect the onset of knock.

* * * * *